US010270308B2

(12) United States Patent
Verot et al.

(10) Patent No.: US 10,270,308 B2
(45) Date of Patent: Apr. 23, 2019

(54) BRUSH-HOLDER SUPPORT PLATE FOR ELECTRIC MOTOR, AND CORRESPONDING BRUSH-HOLDER

(71) Applicant: VALEO EQUIPEMENTS ELECTRIQUES MOTEUR, Creteil (FR)

(72) Inventors: Jacques Verot, Lyons (FR); Maximilien Gentil, Corbas (FR); Jun-Sh Liu, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 274 days.

(21) Appl. No.: 15/129,596

(22) PCT Filed: Mar. 27, 2015

(86) PCT No.: PCT/FR2015/050794
§ 371 (c)(1),
(2) Date: Sep. 27, 2016

(87) PCT Pub. No.: WO2015/150672
PCT Pub. Date: Oct. 8, 2015

(65) Prior Publication Data
US 2017/0149301 A1 May 25, 2017

(30) Foreign Application Priority Data
Mar. 31, 2014 (FR) .................................. 14 52789

(51) Int. Cl.
*H02K 5/14* (2006.01)
*F02N 11/00* (2006.01)
*H01R 39/38* (2006.01)

(52) U.S. Cl.
CPC ............. *H02K 5/143* (2013.01); *F02N 11/00* (2013.01); *H01R 39/385* (2013.01); *H02K 5/148* (2013.01)

(58) Field of Classification Search
CPC .......... H02K 5/143; H02K 5/148; H02K 5/14; F02N 11/00; H01R 39/285
(Continued)

(56) References Cited

U.S. PATENT DOCUMENTS 6,005,323 A    12/1999  Morimoto et al.
7,256,527 B2 *  8/2007  Niimi .................. H01R 39/385
                                                                310/239
(Continued)

FOREIGN PATENT DOCUMENTS

DE    19853641 A1       9/1999
DE   102012111931 A1 *  6/2013  ............. H02K 23/00
(Continued)

*Primary Examiner* — Forrest M Phillips
(74) *Attorney, Agent, or Firm* — Berenato & White, LLC

(57) ABSTRACT

Brush holder support plate (1) for an electric engine comprises a central through-hole (2) for the engine manifold and guide elements (10) for receiving brush holders (20) in sliding connection on the plate. The plate allows the brush holder to be mounted on the plate, engaging same in the direction running from the edge (1e) of the plate towards the central through-hole (2). The plate comprises a non-return stop (11) for each brush holder (20) after the latter has been mounted in sliding connection on the plate, the stop being elastically retractable. The brush holders (20) have a base shaped so as to be received in sliding connection in the guide elements (10) of the plate (1). They have a recess in the base of same suitable for being engaged by the corresponding non-return stop (11) of the plate (1).

20 Claims, 3 Drawing Sheets

(58) Field of Classification Search
USPC .......................................................... 310/239
See application file for complete search history.

(56) References Cited

U.S. PATENT DOCUMENTS

| | | | |
|---|---|---|---|
| 8,395,297 | B2 | 3/2013 | Bayer et al. |
| 2007/0210671 | A1* | 9/2007 | McMillan ............ H01R 39/381 |
| | | | 310/239 |
| 2009/0066185 | A1 | 3/2009 | Kurasawa |
| 2010/0109492 | A1 | 5/2010 | Yamauchi et al. |
| 2010/0277032 | A1* | 11/2010 | De Filippis ............ H01R 39/46 |
| | | | 310/227 |
| 2011/0109181 | A1* | 5/2011 | Ohshima .................. B06B 1/16 |
| | | | 310/81 |
| 2011/0115322 | A1* | 5/2011 | Yu .......................... H02K 5/148 |
| | | | 310/89 |
| 2018/0091025 | A1* | 3/2018 | Kuroda .................. H02K 23/66 |

FOREIGN PATENT DOCUMENTS

| | | | |
|---|---|---|---|
| JP | H0578165 U | 10/1993 | |
| JP | H0767296 A | 3/1995 | |
| JP | H11234968 A | 8/1999 | |
| JP | WO 2013175749 A1 * | 11/2013 | ........... H02K 13/006 |

* cited by examiner

BRUSH-HOLDER SUPPORT PLATE FOR ELECTRIC MOTOR, AND CORRESPONDING BRUSH-HOLDER

CROSS-REFERENCE TO RELATED APPLICATIONS AND CLAIM TO PRIORITY

This application is a national stage application of International Application No. PCT/FR2015/050794 filed Mar. 27, 2015, which claims priority to French Patent Application No. 1452789 filed Mar. 31, 2014, the disclosures of which are incorporated herein by reference and to which priority is claimed.

FIELD OF THE INVENTION

The present invention relates to the field of electric motors with a collector, and more particularly that of starters for a thermal engine of a motor vehicle. More particularly, the invention relates to a brush-holder support plate for an electric motor, a brush-holder which is designed to be received on a plate of this type, and a brush-holder assembly comprising a plate of this type and at least one brush-holder fitted on the latter.

BACKGROUND OF THE INVENTION

For electric motors with a collector such as direct current motors or universal motors, brushes, which are generally carbon-based, and are supported by the stator, come into electrical contact with the collector of the rotor, in order to ensure the electrical connection between the stator and the rotor. The brushes are fitted in a sliding manner in the brush-holders, and are thrust resiliently towards the collector by a spring which is provided between the base of the brush-holder and the brush. It is known to fit the brush-holders on a plate which is secured on the stator, with the plate having a central hole for the passage of the collector, and the brush-holders being arranged radially around the central hole, in order to position the brushes relative to the collector. Plates of this type are described for example in U.S. Pat. No. 7,256,527 B2, U.S. Pat. No. 8,395,297 B2 and JP 7-67296. In order to fit the brush-holders on the plate, the latter has notches or other guide elements with which the base of the brush-holders cooperates. The assembly is carried out by engaging the brush-holders on the plate from the central passage hole of the connector towards the periphery of the plate. The plate additionally has a stop for each brush-holder, in order to stop it radially in the direction of the periphery of the plate, which prevents the brush-holders from being able to collide against the housing of the motor.

However, these plates have the disadvantage of making the fitting of the brush-holders on the motor complex and problematic. In fact, in a first step, it is necessary to fit the brush-holders on the plate, and to insert the brushes in them, then, in a second step, to fit the plate which supports the brush-holders and the brushes on the stator of the motor, whilst making the collector pass through the central passage hole provided in the plate for this purpose. Thus, it is necessary to retain the brush-holders in position on the plate between the first step and the second step, which is generally obtained by fitting with clamped adjustment of the brush-holders on the plate, or by means of a retention unit which is provided on the plate, in order to retain the brush-holder in place on the plate. However, it is also necessary to retain the assembly of the brushes in the brush-holders between the first step and the second step, which is particularly problematic in practice, although once in place, it is no longer necessary to retain the brushes in the brush-holders, since it is the latter which will retain them in place.

The objective of the present invention is to provide a solution which makes it possible to simplify the fitting of the brush-holders and brushes on the stator of the motor.

For this purpose, the present invention proposes a starter for a thermal engine of a motor vehicle, comprising an electric motor, the electric motor comprising a brush-holder assembly for an electric motor, a collector, a head and a bearing, the brush-holder assembly comprising:
at least one brush-holder;
a support plate for this brush-holder for an electric motor, comprising:
a central passage hole for the collector of the electric motor;
guide elements which receive at least the brush-holder in sliding connection on the plate, according to a direction which is radial relative to the central passage hole, the plate being designed to permit fitting of the brush-holder in sliding connection on the plate, by engaging the brush-holder with the guide elements, in the direction going from the periphery of the plate towards the central passage hole;
the plate additionally comprising a non-return stop for each brush-holder after the latter has been fitted in sliding connection on the plate, in the direction going from the periphery of the plate towards the central passage hole, wherein:
the stop is resiliently retractable, in order to permit the fitting of the brush-holder in sliding connection on the plate, in the direction going from the periphery of the plate towards the central passage hole; and
after the brush-holder has been fitted in sliding connection on the plate, the stop opposes rigidly the displacement of the brush-holder, in the direction going from the central passage hole towards the periphery of the plate.

Thus, the brush-holder is fitted at the periphery towards the central passage hole, and is retained by the stop.

According to preferred embodiments, the brush-holder support plate according to the invention comprises one or a plurality of the following characteristics:
the brush-holder is spaced from the head. Just as the brush-holder which is fitted on the plate does not touch the head, the brush-holder does not transmit these vibrations directly to the head when the collector turns. In fact, the plate, which is preferably fitted between the bearing and the head of the electric motor of the starter, attenuates the vibrations in comparison with the case in which the brush holder is supported against the head of the motor of the brush-holder. This attenuation of the vibrations makes it possible to produce less noise. In fact, in the case in which at least one of the stops is the wall of the head, the head would give rise to greater noise;
wherein the plate is made of metal plate and the stop and the guide elements of the sliding connection are obtained from the plate, and are formed by cutting and by resilient deformation of the metal plate. Thus, the stop and the slide are less costly, and the weight is lighter;
the at least one stop is made of metal. Thus, because of the solidity of the stop, a single stop is necessary, and therefore the plate has smaller dimensions;
on a face perpendicular to the main face of the plate surrounding the passage, the brush-holder comprises an opening which allows a braid of the brush to slide throughout the service life of the brush, this being necessary when there is wear of the brush against the collector. Thus, the machine has an improved axial dimension;

the stop is designed to be retracted resiliently under the action of the brush-holder on the stop, during the fitting of the brush-holder in sliding connection on the plate, in the direction going from the periphery of the plate towards the central passage hole;

the stop is also designed such that, after the brush-holder has been fitted in sliding connection on the plate, the stop also opposes rigidly the displacement of the brush-holder in the direction going from the periphery of the plate towards the central passage hole;

the stop is produced in the form of a resilient blade which extends substantially radially relative to the central passage hole, the blade being arranged at one end on the plate on the side towards the periphery of the plate, the opposite end of the blade being free, and being arranged on the side towards the central passage hole, which opposite end is designed to come into contact with the brush-holder in order to oppose rigidly the displacement of the latter, in the direction going from the central passage hole towards the periphery of the plate, the stop being designed to be retracted resiliently by flexion of the resilient blade under the action of the brush-holder during the fitting of the brush-holder in sliding connection on the plate, in the direction going from the periphery of the plate towards the central passage hole;

the blade which forms the stop is designed to be retracted resiliently either in the direction of the face of the plate which is opposite the one which receives the brush-holder, or laterally relative to the direction of the sliding connection between the brush-holder and the plate;

the stop is integral with the plate;

the guide elements are integral with the plate;

the plate is obtained by cutting and resilient deformation of a metal plate.

According to another aspect, the invention also proposes a brush-holder for an electric motor which is designed to be fitted on a brush-holder support plate according to the invention, the brush-holder comprising:

a base which is formed such as to be able to engage the guide elements of the plate in sliding connection; and a recess in the base which can be engaged by the non-return stop of the plate, in order to oppose the displacement of the brush-holder rigidly, at least in the direction going from the central passage hole towards the periphery of the plate.

According to a preferred embodiment, the brush-holder is designed to be fitted on a brush-holder support plate according to the aforementioned preferred embodiment, in which the stop is produced in the form of a resilient blade, the recess in the base of the brush-holder being provided in the lower face of the brush-holder, and the brush-holder comprising a chamfer which is provided in the lower part of the base, which chamfer is designed to engage the blade which forms the non-return stop of the plate, and to retract it resiliently during the fitting of the brush-holder in sliding connection on the plate, in the direction going from the periphery of the plate towards the central passage hole.

The invention also proposes a brush-holder assembly for an electric motor, comprising:

a brush-holder support plate according to the invention; and at least one brush-holder which is received in the guide elements of the plate, wherein the non-return stop of the plate opposes the displacement of the brush-holder rigidly at least in the direction going from the central passage hole towards the periphery of the plate.

According to a preferred embodiment of the brush-holder according to the invention, the non-return stop of the plate is engaged in the recess in the base of the brush-holder in order to oppose the displacement of the brush-holder rigidly at least in the direction going from the central passage hole towards the periphery of the plate.

BRIEF DESCRIPTION OF THE DRAWINGS

Other characteristics and advantages of the invention will become apparent from reading the following description of a preferred embodiment, provided by way of example and with reference to the appended drawing.

DETAILED DESCRIPTION OF THE PREFERRED EMBODIMENT(S)

Figure 1:
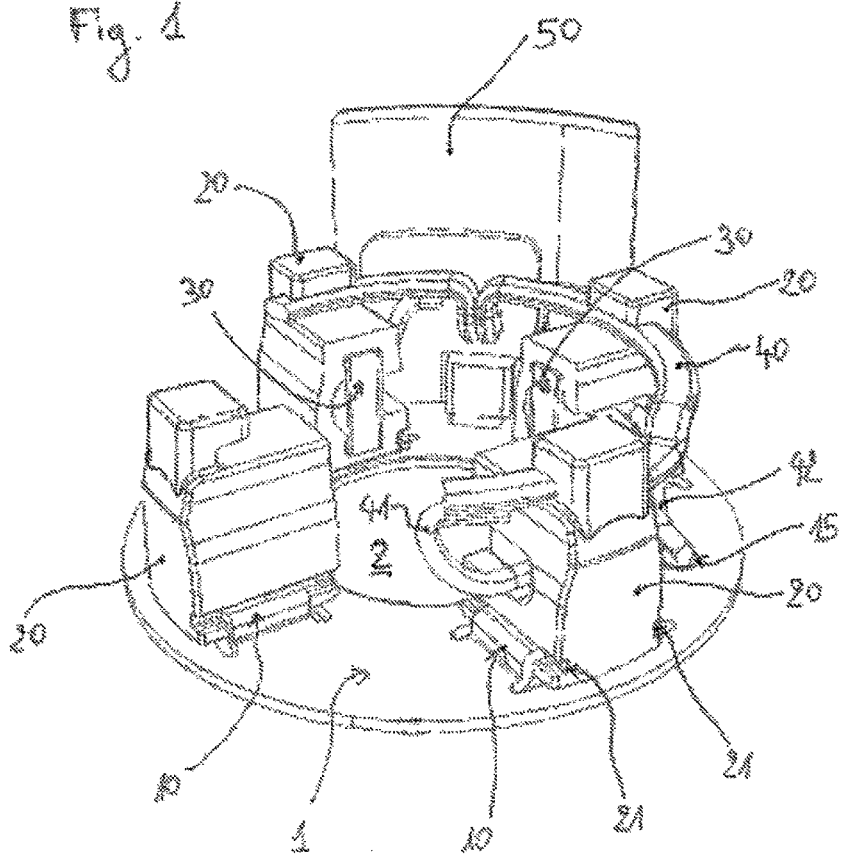
FIG. 1 represents a view of a brush-holder assembly for an electric motor according to the invention.

According to one aspect, the invention proposes a brush-holder support plate for an electric motor. This plate comprises a central passage hole for the collector of the electric motor, and guide elements in order to receive at least one brush-holder in sliding connection on the plate, according to a direction which is radial relative to the central passage hole.

The plate is designed to permit fitting of the brush-holder in sliding connection on the plate, by engaging the brush-holder with the guide elements, in the direction going from the periphery of the plate towards the central passage hole. As a result, it is advantageously possible to fit the plate on the stator of the motor before fitting the brush-holders on the plate. In fact, once the plate has been fitted on the stator, with the collector which passes through the central passage hole in the plate, the brush-holders can be fitted on the plate, since they can engage the guide elements, in the direction going from the periphery of the plate towards the central passage hole. In addition, the brushes will immediately be in their operational position against the collector of the motor, which prevents them from leaving the brush-holders. The fitting process is thus simplified in comparison with the case in which fitting of the brush-holders is carried out from the central passage hole of the plate towards its periphery, since it is possible to dispense with means for retaining the brushes in the brush-holders, or also the brush-holders on the plate, during the fitting time.

The plate additionally comprises a non-return stop for each brush-holder after fitting of the latter in sliding connection on the plate, in the direction going from the periphery of the plate towards the central passage hole. This stop is resiliently retractable, in order to permit the fitting of the brush-holder in sliding connection on the plate, in the direction going from the periphery of the plate towards the central passage hole. It is preferably retracted by the action of the brush-holder on the stop during the fitting in the aforementioned direction. On the other hand, after fitting of the brush-holder in sliding connection on the plate, the stop opposes the displacement of the brush-holder rigidly, in the direction going from the central passage hole towards the periphery of the plate. The stop advantageously makes it possible to prevent the brush-holder from being displaced towards the periphery of the plate after being fitted, and striking the housing of the motor. The stop therefore has an asymmetrical nature, since it opposes strong resistance when, after the brush-holder has been fitted on the plate, it is thrust by the brush-holder, in the direction going from the passage hole towards the periphery of the plate, whereas during the fitting of the brush-holder on the plate, it is thrust such as to oppose only weaker resilient resistance, in order to be able to retract it resiliently, and allow the brush-holder to be put into position on the plate definitively. Preferably, the resistance which is opposed by the stop to the displacement of the brush-holder, in the direction going from the central passage hole towards the periphery of the plate is at least twice the maximum force which is necessary in order to retract the stop resiliently during the fitting of the brush-holder on the plate. More advantageously, the stop can be designed such that only its resilient deformation allows the brush-holder to go beyond the stop, in the direction going from the central passage hole towards the periphery of the plate.

Preferably, the stop is made of metal, in order to allow the stop to retain the brush-holder.

Preferably, the plate is made of metal plate, and the stop and the guide elements of the sliding connection are obtained from the plate, and are formed by cutting and by resilient deformation of the plate. Thus, the plate is simple and light, whilst being robust because of its metal structure.

The plate is preferably fitted against a bearing, not represented, and a head of the motor of a starter, not represented. In particular, only a portion of the outer periphery of the plate is gripped between the bearing and the head of the electric motor.

Preferably, the distance between the outer and minimum diameter of this portion is shorter than the minimum distance between the brush-holder and the head. Thus, the brush-holder is spaced from the head, and does not transmit any vibration directly to the head. In fact, the vibrations pass via the plate, which attenuates them. This makes it possible to reduce the noise.

Figure 2:
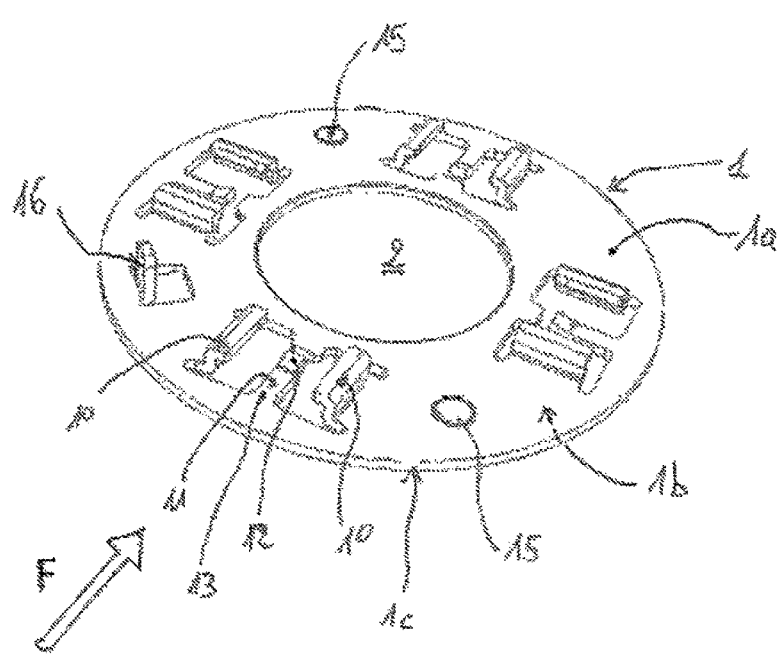
FIG. 2 shows the plate of the brush-holder assembly in FIG. 1.
Figure 3:
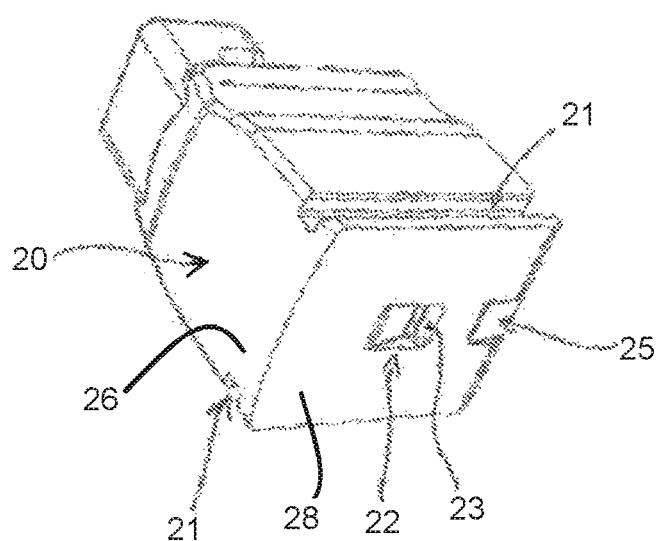
FIG. 3 shows one of the brush-holders of the brush-holder assembly in FIG. 1.

FIGS. 1 to 3 show an embodiment of the invention. FIG. 1 illustrates the brush-holder assembly which comprises a support plate 1 bearing an even number of brush-holders 20. In this case, the number of brush-holders 20 is four, but this can be different. The brush-holders 20 are arranged radially relative to a central hole 2 in the support plate 1, which is designed for the passage of the collector of the motor (not represented). The brush-holders 20 are distributed around the central passage hole 2. Each brush-holder 20 supports a brush 30 which is constrained resiliently, in the direction of the axis of the central passage hole 2, in other words towards the collector of the motor. The resilient constraint can conventionally be provided by a helical spring (not provided) arranged in a base 26 of the brush-holder 20. For the electrical connection of the motor, a rigid conductor 40 passes through a support part 50 which is made of insulating material, and is retained in place in receptacles provided for this purpose on the top of the brush-holders 20. The conductor 40 is connected to one brush 30 out of two by means of other conductors 41 which are welded on the conductor 40, whereas the other brushes 30 are connected to locations 15 provided for this purpose on the support plate 1 which is connected to the earth of the motor.

For each brush-holder 20, the plate 1 comprises a slide which is formed by two wings 10 which have a profile in the form of an "L", and face one another. Each brush-holder 20 comprises on each side in the lower part a lateral groove 21 which cooperates with a respective flap 10 for fitting of the brush-holder 20 in sliding connection on the plate 1.

As can be seen in FIG. 2, for each brush-holder 20, the support plate 1 also comprises a single resilient blade 11 which forms a single non-return stop for each brush-holder 20 after having been fitted on the support plate 1. The blade 11 extends substantially radially relative to the central passage hole 2. It is arranged at one end 13 on the support plate 1 on the side towards a periphery 1c of the support plate 1. A distal end 12 of the resilient blade 11 is free, and is arranged on the side towards (i.e., adjacent to) the central passage hole 2. The distal end 12 is designed to come into contact with the brush-holder 20, in order to ensure the function of a stop for the latter after it has been fitted on the support plate 1. For this purpose, the distal end 12 of the blade is folded upwards, in order to project in the passage defined between the flaps 10 for the brush-holder 20. The brush-holder 20 has a recess 22 provided in a lower face (or surface) 28 of the base 26 of the brush-holder 20, with a substantially vertical surface 23 on a front side of the brush-holder 20. The front side means the side of the brush-holder 20 from which the brush 30 projects out of the brush-holder, and which is in front of the collector of the motor, when the brush-holder assembly is in place on the stator of the motor. The recess 22 in the brush-holder 20 is designed to be engaged by the distal end 12 of the blade 11 when the brush-holder 20 is fitted on the support plate 1. The distal end 12 is supported against the surface 23 of the recess 22, when the brush-holder is thrust in a radial direction (F) going from the central passage hole 2 towards the periphery 1c of the support plate 1, which has the effect of blocking the displacement of the brush-holder 20 in this direction. This advantageously prevents the brush-holder 20 from being able to withdraw in the slide which is formed by the wings 10, and come into contact with the housing of the motor.

As can be seen in FIG. 2, the wings 10 which form the slide and the blade 11 can be obtained simply by cutting and folding and/or stamping the metal plate which forms the plate 1.

The elements can advantageously be fitted as follows. Initially, the blank plate 1 for the brush-holders 20 is secured on the stator of the motor, on which the rotor has previously been fitted. The plate 1 is secured on the stator by any appropriate means, such as screws which pass through screw passages (not represented) provided in the plate 1.

The brush-holders 20 with their brushes 30 are then engaged in their slide which is formed by the wings 10, from the periphery, in the direction of the central passage hole. This direction of engagement is schematised in FIG. 2 by the arrow F for the location corresponding to the brush-holder 20 on the support plate 1. During this operation, the front side of the base 26 of the brush-holder 20 passes above the blade 11, and comes into contact with it in this case with the distal end 12 of the resilient blade 11, because it is folded and biased upwards toward the brush-holder 20.

As can be seen in FIG. 2, the distal end 12 forms an acute angle relative to the direction of the slide which is formed by the corresponding wings 10, taken in the direction from the periphery 1c towards the central passage hole 2. Thus, the front side of the base 26 of the brush-holder 20 thrusts the blade 11 resiliently downwards, i.e. in the direction going from a top face 1a of the support plate 1, which receives the brush-holder 20, towards an axially opposite bottom face 1b of the support plate 1, as the brush-holder 20 is thrust towards the central passage hole 2. In other words, the distal end 12 of the resilient blade 11 is moveable in a direction orthogonal to the top face of the support plate (1) and the resilient blade 11 is subjected to flexion (i.e., bent downwardly) under the action of the brush-holder 20.

At a given moment of the displacement of the brush-holder 20 towards the central passage hole 2, the end part 12 of the blade 11 passes below the base of the brush-holder, and then engages in the recess 22 by resilient return. In order to thrust the blade 11 back easily and facilitate the passage of its end 12 below the base of the brush-holder 20, a chamfer 25 can be provided in the lower face on the front side of the brush-holder 20, in order to engage it in favourable conditions. It will be understood that the yield strength of the material of the blade 11 is never exceeded during the flexion of the blade 11.

SUMMARY OF THE INVENTION

Once the end part 12 is engaged in the recess 22, the brush-holder 20 is in its definitive fitting position, and the brushes 30 are in contact with the collector of the motor. From this position, the brush-holder can possibly advance further towards the central passage hole 2, which is not problematic since it is retained by the collector via its brush 30. On the other hand, it is no longer possible for it to withdraw towards the periphery 1c of the plate, because of the end 12 of the blade 11, which is supported against the stop surface 23. In fact, the thrusting of the brush-holder 20 on the blade 11 takes place substantially according to the longitudinal axis of the blade 11, towards the end 13 of the blade 11 by means of which it is arranged on the plate 1. In other words, the thrusting of the blade 11 takes place with compression, and no longer with flexion, as during the fitting of the brush-holder 20 on the plate 1 from the periphery towards the central passage hole 2. Thus, the blade 11 does not retract resiliently from the passage of the brush-holder 20, as is the case when it is being fitted, but on the contrary it opposes its displacement rigidly. The rigidity of the blade 11 thus opposed can be extremely important, since the form of the blade 11 can be defined such that the blade holder 20 going beyond the stop formed by the blade 11 involves the destruction of the blade 11 by buckling, on the understanding that a level of stress of this type is never reached in practice.

The form of the end 12 and of the recess 22 can also be designed to prevent the displacement of the brush-holder 20 towards the central passage hole 2. This advantageously makes it possible to prevent or limit any front to rear vibrations of the brush-holder 20 in the slide, when the brushes are worn, and when the brush springs no longer have sufficient force to place the brush-holder 20 against the end 12 of the blade 11.

It will be appreciated that the present invention is not limited to the examples and the embodiment described and represented, but can form the basis of numerous variants which are accessible to persons skilled in the art.

By way of example, the blade 11 which forms a stop can be provided laterally relative to the direction of the sliding connection between the brush-holder 20 and the plate 1. This can be carried out by subdividing one of the wings 10, in order to retain only a front part and a rear part, whereas the intermediate portion is in the form of a radial blade, with a free end part on the side towards the central passage hole 2. The free end part of the blade projects into the passage of the brush-holder, and is designed to be retracted resiliently in the lateral direction by the brush-holder when it is fitted on the plate 1. In this case, the brush-holder 20 has a recess or a notch on the side in which the free end of the blade engages, in order to serve the purpose of a stop in the same manner as in the case of the recess 22.

According to another example, the non-return stop can be retracted resiliently during the fitting of the brush-holder on the plate by means of an appropriate tool, instead of being retracted by the action of the brush-holder on the stop. However, the fact that it is the action of the brush-holder on the stop which retracts it resiliently is advantageous since it is not necessary to use a tool for this purpose.

The invention claimed is:

1. A starter for a thermal engine of a motor vehicle, the starter comprising an electric motor, the electric motor comprising a brush-holder assembly for an electric motor, a collector, a head and a bearing, the brush-holder assembly comprising:
   at least one brush-holder (20);
   a support plate (1) for supporting the at least one brush-holder on a top face thereof, the support plate (1) comprising:
      a central passage hole (2) for the collector of the electric motor;
      guide elements (10) receiving the at least one brush-holder (20) in sliding connection on the support plate in a direction (F) radial relative to the central passage hole (2) and extending from a periphery (1c) of the support plate towards the central passage hole (2); and
      a non-return stop (11) corresponding to the at least one brush-holder (20) and disposed between the at least one brush-holder (20) and a top face of the support plate (1),
   the at least one brush-holder is mounted on the support plate by slidingly engaging the guide elements in the radial direction (F);
   the non-return stop (11) engaging the at least one brush-holder non-moveably at least in the radial direction (F), wherein:
      the non-return stop is attached to the top face of the support plate (1) and is resiliently moveable in a direction orthogonal to the top face of the support plate (1) in order to engage the at least one brush-holder in sliding connection on the support plate in the radial direction (F); and
   the non-return stop (11) is disposed between the guide elements (10) and opposes the displacement of the at least one brush-holder rigidly in a radial direction opposite to the radial direction (F).

2. The starter according to claim 1, wherein the at least one brush-holder is spaced from the head.

3. The starter according to claim 1, wherein the support plate is a metal plate including the resilient non-return stop and the deformed guide elements of the sliding connection obtained from the metal plate, and formed by cutting and by deforming the metal plate.

4. The starter according to claim 1, wherein the non-return stop (11) is configured to be retracted resiliently under the action of the at least one brush-holder (20) on the non-return stop, during the fitting of the at least one brush-holder in sliding connection on the support plate in the radial direction (F).

5. The starter according to claim 1, wherein the non-return stop (20) is also configured such that, after the at least one brush-holder (20) has been fitted in sliding connection on the plate, the non-return stop also opposes rigidly the displacement of the at least one brush-holder in the radial direction opposite to the radial direction (F).

6. The starter according to claim 1, wherein the non-return stop (11) is produced in the form of a single resilient blade which corresponds to the at least one brush-holder (20) and extends substantially radially relative to the central passage hole (2) and is resilient in the direction orthogonal to the top face of the support plate (1), wherein the resilient blade is arranged at one end (13) on the support plate adjacent to the periphery (1c) of the support plate, wherein the resilient blade has a free distal end (12) resiliently moveable in the direction orthogonal to the top face of the support plate (1), wherein the free distal end (12) of the resilient blade is arranged on a side of the support plate (1) adjacent to the central passage hole (2), wherein the free distal end is configured to come into contact with the at least one brush-holder (20) in order to oppose the displacement of the at least one brush-holder (20) in the radial direction (F), and wherein the non-return stop (11) is configured to be retracted resiliently in the direction orthogonal to the top face of the support plate (1) by flexion of the resilient blade under the action of the at least one brush-holder (20) during the fitting of the at least one brush-holder in sliding connection on the support plate in the radial direction (F).

7. The starter according to claim 6, wherein the single resilient blade (11) is configured to be retracted resiliently in the direction of a bottom face (1b) of the support plate, which is opposite to the top face (1a) of the support plate, to which the at least one brush-holder (20) is mounted.

8. The starter according to any claim 1, wherein the at least one brush-holder comprises:
a base (26) configured to engage the guide elements (10) of the support plate (1) in sliding connection; and
a recess (22) in the base configured to be engaged by the non-return stop (11) of the support plate (1) in order to oppose the displacement of the at least one brush-holder rigidly at least in the radial direction opposite to the radial direction (F).

9. The starter according to claim 8, wherein the recess (22) is provided in a lower face (28) of the at least one brush-holder (20), wherein the at least one brush-holder comprises a chamfer (25) provided in the lower face (28), wherein the chamfer is configured to engage the non-return stop (11) in the form of a resilient blade, and to retract the non-return stop (11) resiliently during the fitting of the at least one brush-holder sliding on the support plate (1) in the radial direction (F).

10. The starter according to claim 8, wherein the non-return stop (11) of the plate (1) is engaged in the recess (22) in the base of the brush-holder in order to oppose the displacement of the brush-holder (20) rigidly at least in the radial direction opposite to the radial direction (F).

11. The starter according to claim 2, wherein the support plate is a metal plate including the resilient non-return stop and the deformed guide elements of the sliding connection obtained from the metal plate, and formed by cutting and by deforming the metal plate.

12. The starter according to claim 2, wherein the non-return stop (11) is configured to be retracted resiliently under the action of the at least one brush-holder (20) on the non-return stop, during the fitting of the at least one brush-holder in sliding connection on the support plate in the radial direction (F).

13. The starter according to claim 3, wherein the non-return stop (11) is configured to be retracted resiliently under the action of the at least one brush-holder (20) on the non-return stop, during the fitting of the at least one brush-holder in sliding connection on the support plate in the radial direction (F).

14. The starter according to claim 2, wherein the non-return stop (20) is also configured such that, after the at least one brush-holder (20) has been fitted in sliding connection on the plate, the non-return stop also opposes rigidly the displacement of the at least one brush-holder in the radial direction (F).

15. Starter according to claim 3, wherein the non-return stop (20) is also configured such that, after the at least one brush-holder (20) has been fitted in sliding connection on the plate, the non-return stop also opposes rigidly the displacement of the at least one brush-holder in the radial direction (F).

16. Starter according to claim 4, wherein the non-return stop (20) is also configured such that, after the at least one brush-holder (20) has been fitted in sliding connection on the plate, the non-return stop also opposes rigidly the displacement of the at least one brush-holder in the radial direction (F).

17. Starter according to claim 2, wherein the non-return stop (11) is produced in the form of a single resilient blade which corresponds to the at least one brush-holder (20) and extends substantially radially relative to the central passage hole (2) and is resilient in the direction orthogonal to the top face of the support plate (1), wherein the resilient blade is arranged at one end (13) on the support plate adjacent to the periphery (1c) of the support plate, wherein the resilient blade has a free distal end (12) resiliently moveable in the direction orthogonal to the top face of the support plate (1), wherein the free distal end (12) of the resilient blade is arranged on a side of the support plate (1) adjacent to the central passage hole (2), wherein the free distal end is configured to come into contact with the at least one brush-holder (20) in order to oppose the displacement of the at least one brush-holder (20) in the radial direction opposite to the radial direction (F), and wherein the non-return stop (11) is configured to be retracted resiliently in the direction orthogonal to the top face of the support plate (1) by flexion of the resilient blade under the action of the at least one brush-holder (20) during the fitting of the at least one brush-holder in sliding connection on the support plate in the radial direction (F).

18. Starter according to claim 3, wherein the non-return stop (11) is produced in the form of a single resilient blade which corresponds to the at least one brush-holder (20) and extends substantially radially relative to the central passage hole (2) and is resilient in the direction orthogonal to the top face of the support plate (1), wherein the resilient blade is arranged at one end (13) on the support plate adjacent to the periphery (1c) of the support plate, wherein the resilient blade has a free distal end (12) resiliently moveable in the direction orthogonal to the top face of the support plate (1), wherein the free distal end (12) of the resilient blade is arranged on a side of the support plate (1) adjacent to the central passage hole (2), wherein the free distal end is configured to come into contact with the at least one brush-holder (20) in order to oppose the displacement of the at least one brush-holder (20) in the radial direction opposite to the radial direction (F), and wherein the non-return stop (11) is configured to be retracted resiliently in the direction orthogonal to the top face of the support plate (1) by flexion of the resilient blade under the action of the at least one brush-holder (20) during the fitting of the at least one brush-holder in sliding connection on the support plate in the radial direction (F).

19. Starter according to claim 4, wherein the non-return stop (11) is produced in the form of a single resilient blade which corresponds to the at least one brush-holder (20) and extends substantially radially relative to the central passage hole (2) and is resilient in the direction orthogonal to the top face of the support plate (1), wherein the resilient blade is arranged at one end (13) on the support plate adjacent to the periphery (1c) of the support plate, wherein the resilient blade has a free distal end (12) resiliently moveable in the direction orthogonal to the top face of the support plate (1), wherein the free distal end (12) of the resilient blade is arranged on a side of the support plate (1) adjacent to the central passage hole (2), wherein the free distal end is configured to come into contact with the at least one brush-holder (20) in order to oppose the displacement of the at least one brush-holder (20) in the radial direction opposite to the radial direction (F), and wherein the non-return stop (11) is configured to be retracted resiliently in the direction orthogonal to the top face of the support plate (1) by flexion of the resilient blade under the action of the at least one brush-holder (20) during the fitting of the at least one brush-holder in sliding connection on the support plate in the radial direction (F).

20. Starter according to claim 5, wherein the non-return stop (11) is produced in the form of a single resilient blade which corresponds to the at least one brush-holder (20) and extends substantially radially relative to the central passage hole (2) and is resilient in the direction orthogonal to the top face of the support plate (1), wherein the resilient blade is arranged at one end (13) on the support plate adjacent to the periphery (1c) of the support plate, wherein the resilient blade has a free distal end (12) resiliently moveable in the direction orthogonal to the top face of the support plate (1), wherein the free distal end (12) of the resilient blade is arranged on a side of the support plate (1) adjacent to the central passage hole (2), wherein the free distal end is configured to come into contact with the at least one brush-holder (20) in order to oppose the displacement of the at least one brush-holder (20) in the radial direction opposite to the radial direction (F), and wherein the non-return stop (11) is configured to be retracted resiliently in the direction orthogonal to the top face of the support plate (1) by flexion of the resilient blade under the action of the at least one brush-holder (20) during the fitting of the at least one brush-holder in sliding connection on the support plate in the radial direction (F).

* * * * *